United States Patent
Kamath et al.

(10) Patent No.: US 9,052,848 B2
(45) Date of Patent: Jun. 9, 2015

(54) WEB PRINTING A PRINT REQUEST VIA A LIST OF JOB TASKS

(75) Inventors: Harish B. Kamath, Bengalooru (IN);
Manasa Sridhar, Bangalore (IN);
Atulram Pai Konchady, Bangalore (IN)

(73) Assignee: Hewlett-Packard Development Company, L.P., Houston, TX (US)

( * ) Notice: Subject to any disclaimer, the term of this patent is extended or adjusted under 35 U.S.C. 154(b) by 1298 days.

(21) Appl. No.: 12/544,223

(22) Filed: Aug. 20, 2009

(65) Prior Publication Data

US 2011/0007347 A1 Jan. 13, 2011

(30) Foreign Application Priority Data

Jul. 7, 2009 (IN) .......................... 1603/CHE/2009

(51) Int. Cl.
*G06F 3/12* (2006.01)

(52) U.S. Cl.
CPC ............ *G06F 3/1203* (2013.01); *G06F 3/1262* (2013.01); *G06F 3/1263* (2013.01)

(58) Field of Classification Search
USPC ........... 358/1.15, 1.5, 1.9; 707/636, 652, 709, 707/721; 709/229, 201, 203, 245
See application file for complete search history.

(56) References Cited

U.S. PATENT DOCUMENTS

| | | | |
|---|---|---|---|
| 5,287,194 A | 2/1994 | Lobiondo | |
| 5,559,933 A | 9/1996 | Boswell | |
| 6,615,234 B1 * | 9/2003 | Adamske et al. | 709/203 |
| 6,650,433 B1 * | 11/2003 | Keane et al. | 358/1.15 |
| 6,650,946 B2 * | 11/2003 | Bauer | 700/23 |
| 6,748,471 B1 | 6/2004 | Keeney et al. | |
| 6,958,824 B2 | 10/2005 | Whitmarsh | |
| 6,975,419 B2 | 12/2005 | Staas et al. | |
| 7,106,470 B2 | 9/2006 | Parry | |
| 7,167,930 B2 | 1/2007 | Reilly | |
| 7,184,159 B2 | 2/2007 | Bergstrand | |
| 7,218,411 B2 * | 5/2007 | Hohensee et al. | 358/1.15 |
| 7,298,511 B2 | 11/2007 | Lay et al. | |
| 7,321,437 B2 | 1/2008 | Parry | |
| 7,474,423 B2 | 1/2009 | Garcia et al. | |
| 8,253,956 B2 * | 8/2012 | Han | 358/1.15 |
| 2004/0130744 A1 * | 7/2004 | Wu et al. | 358/1.15 |
| 2004/0190057 A1 * | 9/2004 | Takahashi et al. | 358/1.15 |
| 2004/0249934 A1 | 12/2004 | Anderson et al. | |
| 2007/0297009 A1 * | 12/2007 | Kikuchi | 358/1.18 |
| 2009/0279126 A1 * | 11/2009 | Williams | 358/1.15 |
| 2009/0303523 A1 * | 12/2009 | Moross et al. | 358/1.15 |

* cited by examiner

*Primary Examiner* — Benny Q Tieu
*Assistant Examiner* — Sunil Chacko
(74) *Attorney, Agent, or Firm* — Philip Scott Lyren

(57) ABSTRACT

One embodiment is a method that analyzes a print request that is transmitted over an internet and received at a cloud print system. The method then executes with priorities a list of job tasks to print the print request at a web-enabled printer.

24 Claims, 6 Drawing Sheets

300

| ID | PROGRAM_CODE | PROGRAM_NAME | PRECEDENT | CATEGORY |
|---|---|---|---|---|
| 1 | PIN | NOTIFICATION_PIN | 12 | PRE_PROCESSING |
| 2 | TXTTOPDF | CONVERT_TXT_TO_PDF | 11 | PRE_PROCESSING |
| 3 | DOCTOPDF | CONVERT_DOC_TO_PDF | 11 | PRE_PROCESSING |
| 4 | JOBSEPARATOR | ADD_JOB_SEPARATOR | 9 | PRE_PROCESSING |
| 5 | IMAGETOPS | CONVERT_IMAGE_PS | 8 | PRE_PROCESSING |
| 6 | IMAGETOPCL | CONVERT_IMAGE_PCL | 6 | PRE_PROCESSING |
| 7 | PCLSTITCH | PCL_STITCHING | 5 | PRE_PROCESSING |
| 9 | PRE_PROCESSING_END | PRE_PROCESSING_END | 4 | PRE_PROCESSING |
| 10 | TOQUEUE | POST_TO_QUEUE | 3 | PRINTING |
| 11 | TOPRINTER | SEND_TO_PRINTER | 3 | PRINTING |
| 12 | SMS | NOTIFICATION_SMS | 2 | POST_PROCESSING |
| 13 | EMAIL | NOTIFICATION_EMAIL | 2 | POST_PROCESSING |
| 14 | REPORT | NOTIFICATION_ADMIN | 2 | POST_PROCESSING |
| 15 | CLEANUP | JOB_CLEANUP | 1 | POST_PROCESSING |
| 16 | IMAGETOPDF | CONVERT_IMAGE_PDF | 11 | PRE_PROCESSING |
| 17 | PDFTOPNG | CONVERT_PDF_TO_PNG_PREVIEW | 10 | PRE_PROCESSING |
| 18 | PSPRINTPREF | PS_PRINT_PREFERENCES | 5 | PRE_PROCESSING |
| 19 | PDFPRINTPREF | PDF_PRINT_PREFERENCE | 5 | PRE_PROCESSING |

| ID | PROGRAM_CODE | PROGRAM_NAME | PRECEDENT | CATEGORY |
|---|---|---|---|---|
| 1 | PIN | NOTIFICATION_PIN | 12 | PRE_PROCESSING |
| 2 | TXTTOPDF | CONVERT_TXT_TO_PDF | 11 | PRE_PROCESSING |
| 3 | DOCTOPDF | CONVERT_DOC_TO_PDF | 11 | PRE_PROCESSING |
| 4 | JOBSEPARATOR | ADD_JOB_SEPARATOR | 9 | PRE_PROCESSING |
| 5 | IMAGETOPS | CONVERT_IMAGE_PS | 8 | PRE_PROCESSING |
| 6 | IMAGETOPCL | CONVERT_IMAGE_PCL | 6 | PRE_PROCESSING |
| 7 | PCLSTITCH | PCL_STITCHING | 5 | PRE_PROCESSING |
| 9 | PRE_PROCESSING_END | PRE_PROCESSING_END | 4 | PRE_PROCESSING |
| 10 | TOQUEUE | POST_TO_QUEUE | 3 | PRINTING |
| 11 | TOPRINTER | SEND_TO_PRINTER | 3 | PRINTING |
| 12 | SMS | NOTIFICATION_SMS | 2 | POST_PROCESSING |
| 13 | EMAIL | NOTIFICATION_EMAIL | 2 | POST_PROCESSING |
| 14 | REPORT | NOTIFICATION_ADMIN | 2 | POST_PROCESSING |
| 15 | CLEANUP | JOB_CLEANUP | 1 | POST_PROCESSING |
| 16 | IMAGETOPDF | CONVERT_IMAGE_PDF | 11 | PRE_PROCESSING |
| 17 | PDFTOPNG | CONVERT_PDF_TO_PNG_PREVIEW | 10 | PRE_PROCESSING |
| 18 | PSPRINTPREF | PS_PRINT_PREFERENCES | 5 | PRE_PROCESSING |
| 19 | PDFPRINTPREF | PDF_PRINT_PREFERENCE | 5 | PRE_PROCESSING |

FIG. 3

WEB PRINTING A PRINT REQUEST VIA A LIST OF JOB TASKS

CROSS-REFERENCE TO RELATED APPLICATION

The present application cross-references and claims priority to parent patent application filed with the Indian Patent Office on 7 Jul. 2009 and having Indian application number 1603/CHE/2009.

BACKGROUND

In order to print a document, a user typically selects a print command from an application program to initiate print services of the operating system. The print services present a user interface in the form of a print dialog box that allows the user to select various print options, such as paper source, number of copies, page orientation, print quality, etc. After the user selects the print options and commences the print operation, the operating system uses a printer driver to convert the document to a PDL (page description language) format that is specific to the printer selected by the user. The printer driver then directs the PDL to the printer where it is rendered as a hardcopy output.

These tasks are relatively common and straightforward when the document is printed to a local printer. These tasks, however, become quite complicated if the user desires to print the document over the internet to a remote printer.

BRIEF DESCRIPTION OF THE DRAWINGS

FIG. 3 shows a table with job tasks assigned a precedent in accordance with an exemplary embodiment of the present invention.

SUMMARY OF THE INVENTION

One embodiment is a method that analyzes a print request that is transmitted over an internet and received at a cloud print system. The method then executes with priorities a list of job tasks to print the print request at a web-enabled printer.

DETAILED DESCRIPTION

Exemplary embodiments in accordance with the invention relate to systems and methods that analyze and process print job requests to print to a web-enabled printer.

Multiple users geographically distributed throughout different parts of the world can simultaneously transmit print jobs to a cloud print system. A web-service in the cloud receives the print jobs and transports them to web-enabled or networked printers. The web-service processes a large number of print jobs arriving from one or more users and also adapts to integrate new functionality into the web-service.

A list of tasks is created for each print job, and an order of precedence is assigned to each task of the print job. The precedence determines an order for executing the tasks which can be executed on a variety of different systems participating in a distributed network connected to the cloud.

Figure 1:
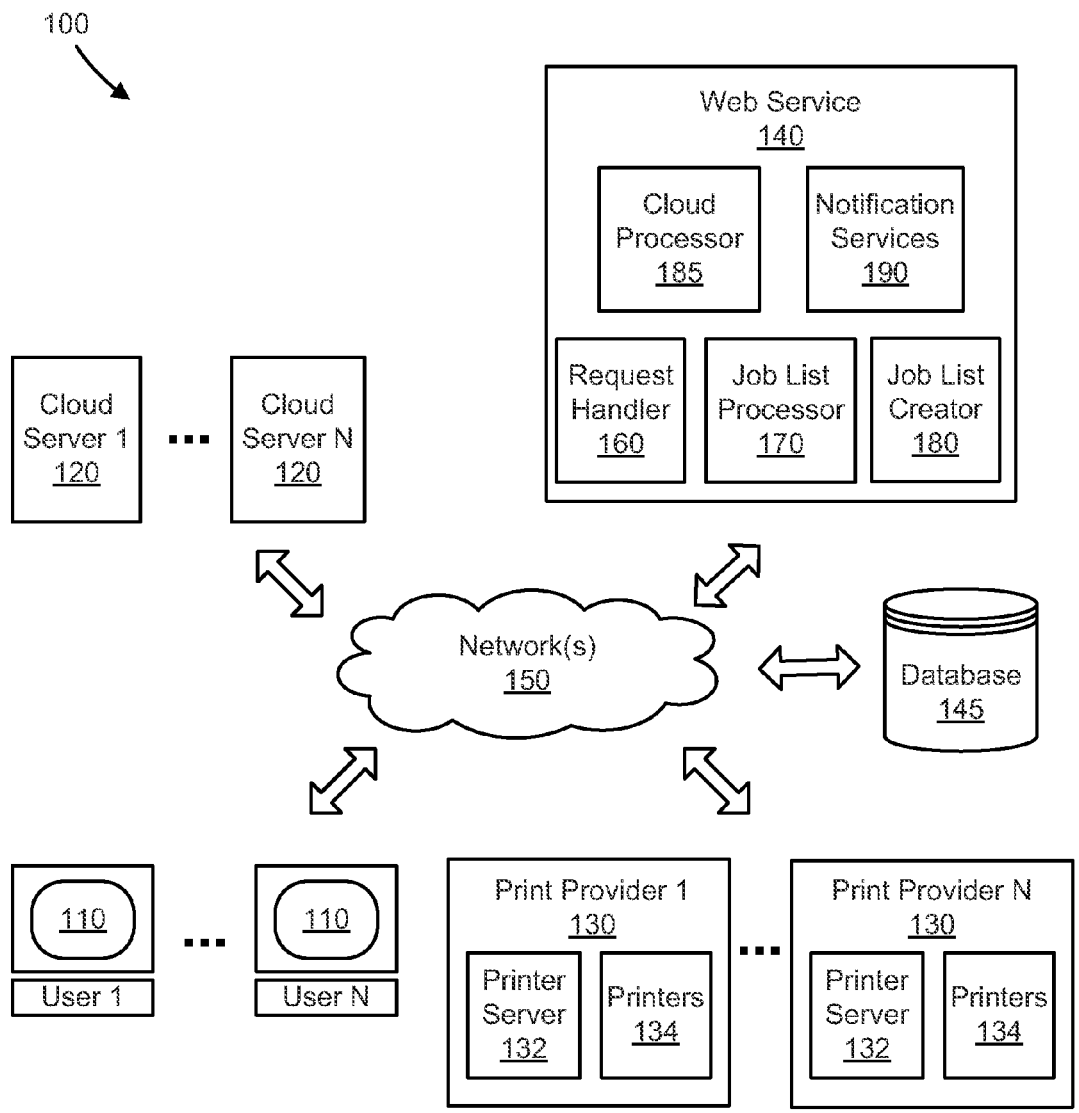
FIG. 1 shows a cloud print system in accordance with an exemplary embodiment of the present invention.

FIG. 1 shows a cloud print system 100 in accordance with an exemplary embodiment of the present invention. The system includes a plurality of users or computers 110 (shown as user 1 to user N), a plurality of cloud servers 120 (shown as cloud server 1 to cloud server N), a plurality of print providers 130 (shown as print provider 1 to print provider N with each print provider including a print server 132 and one or more printers 134), a web service 140, and a database 145 in communication with each other through one or more networks 150 (such as the internet and world wide web). The print servers 132 can be external to the printer or embedded inside of the printer. The web service 140 further includes a request handler 160, job list processor 170, job list creator 180, cloud processor 185, and notification services 190. The cloud processor 185 performs processing functions for the cloud, and the notification services 190 notifies a user, computer, or administrator of job status, such as print job complete, printing error, etc.

Exemplary embodiments provide printing services to users who connect to the cloud through the internet. The cloud print system enables users to print from different geographical locations around the world using computers that run different operating systems, such as Linux, Windows, etc. The printing functions provided by the cloud are equally provided to these different operating systems since the printing workflow is divided into independent functions. More specifically as discussed below, print requests are divided into job lists that include multiple job tasks executed in an order according to assigned priorities.

Users are able to print emails, documents, photos, web pages, etc. from a variety of different portable devices manufactured by different companies. Mobile users can print to one or more printers from any worldwide location that provides internet access, regardless of whether the user is located at home, in the office, on the road, in a foreign country, etc. The print services provided by the cloud print system are printer-agnostic and driverless (i.e., the computers of the users are not required to have a print driver: software that converts data to be printed to a form specific to the computer). Functions of the print driver are provided by the cloud, not the user computer that initiated the print job request.

As discussed below, processing and executing a large number of print job requests from multiple users involves a number of sub-operations. These sub-operations are broadly divided into one of two types: those specified by the user or specified by cloud print systems as part of the print operation. As an example, an SMS notification request sent from the notification services 190 to the user 110 is a user specified event, while counting sheets being printed is transparent to the user and a cloud system event.

The sub-operations are performed in a specified order or sequence that is based, in part, on assigned priorities or precedents. For example, sheet counting operations are performed after PostScript documents are created. As another example, a document is sent to the printer only when the document is prepared for printing. Furthermore, with exemplary embodiments, the number of sub-operations (job steps)

for a given print job can vary depending on the type of print job, platform or operating system requesting the print job, etc.

Generally, a print job work item is performed with the following operations: handling user requests, creating a job list, and processing the job list. The print job request handler 160 acts on all the user requests. The job list creator 180 creates job steps, and the job list processor 170 executes the job steps according to the assigned priorities. These tasks are more fully discussed below.

The request handler 160 records print requests received from users or electronic devices and responds with a job identifier, job-id to the user. The print job request is concluded on completion of the print job request handler and on sending a response message with the job-id to the print user.

In one exemplary embodiment, the request handler 160 performs one or more of the following functions:
1. Create job-id.
2. Create a folder for the job-id. The name of folder is the job-id in a location specified in the path.
3. If the job status is successfully recorded, request items into the database and file-system.
4. Respond to the requestor with the job-id.
5. Log intermediate operation details.
6. If job status is an error, set the job-state to "DONE".
7. If job status is successful, set the job-state to "AVAILABLE".

The job list creator 180 generates and outputs a list of job steps. The order and precedence values are generated when preparing the job list. The job step list is recorded in a cell of the job record of the database.

In one exemplary embodiment the job list creator 180 is a system wide application that periodically runs (for example, the program is activated every minute). The job list creator performs one or more of the following functions:
1. Fetch a job from the job records having a job state as "AVAILABLE".
2. Set the job status to success.
3. Set the job state to "CREATE".
4. Create a job list for the preprocessing tasks.
5. If the job status is successful, create a job list for the printing tasks.
6. If the job status is successful, create a job list for the post-processing tasks.
7. If the job status is successful, set the job state to "READY".
8. If job status is an error, set the job state to "DONE".
9. Log or store the job task details.

The job list creator 180 creates a job list according to the following steps:
a. Initialize the job list.
b. For each task item corresponding to the job list, add to the list (database). Items are fetched based on order of precedence.
c. If an error occurs, set the job status to error.
d. Log the task.

In one exemplary embodiment, the job list is composed of tokens, each token separated by a ";". The tokens from left to right give the order in which it is executed (i.e., the tokens are arranged in an order according to a priority of execution).

The job list is formed by looking at all the items in the order of precedence listed in the precedence table. The highest ordered precedence item is looked for a value in the job record, then the next item and so on by which the list is formed.

The precedence levels could be any in number, and the number of job tasks in the system is any count. The corresponding items from the database are fetched by obtaining column name from the precedence table.

The job list processor 170 processes the tasks as ordered in the list. This process performs various intermediate operations including sending data to the printer.

In one exemplary embodiment, the job list processor is a system wide application that periodically runs (for example, the program is activated every minute).

The job list processor performs one or more of the following functions:
1. Fetch a job from job records having a job state as "READY" or "QUEUED" or "PRINTED".
2. If in the "READY" state, set the job state to "PROCESSING".
3. Get the job list.
4. Execute the job list (in the given sequence).
5. Log task details.
6. If in the "PROCESSING" state and status is successful, set the job state to "QUEUED".
7. If in the "PROCESSING" state and status is "ERROR", set the job state to "DONE".
8. If in the "QUEUED" state and the job state is error and retries>max retries, set the job state to "DONE".
9. If in the "QUEUED" state and the job state is completed, set the job state to "PRINTED".
10. If in the "PRINTED" state, set the job state to "DONE".

The states in which the job list processor fetches can vary and are not restricted to those listed above. A fewer or greater number of steps can be added.

Figure 2:
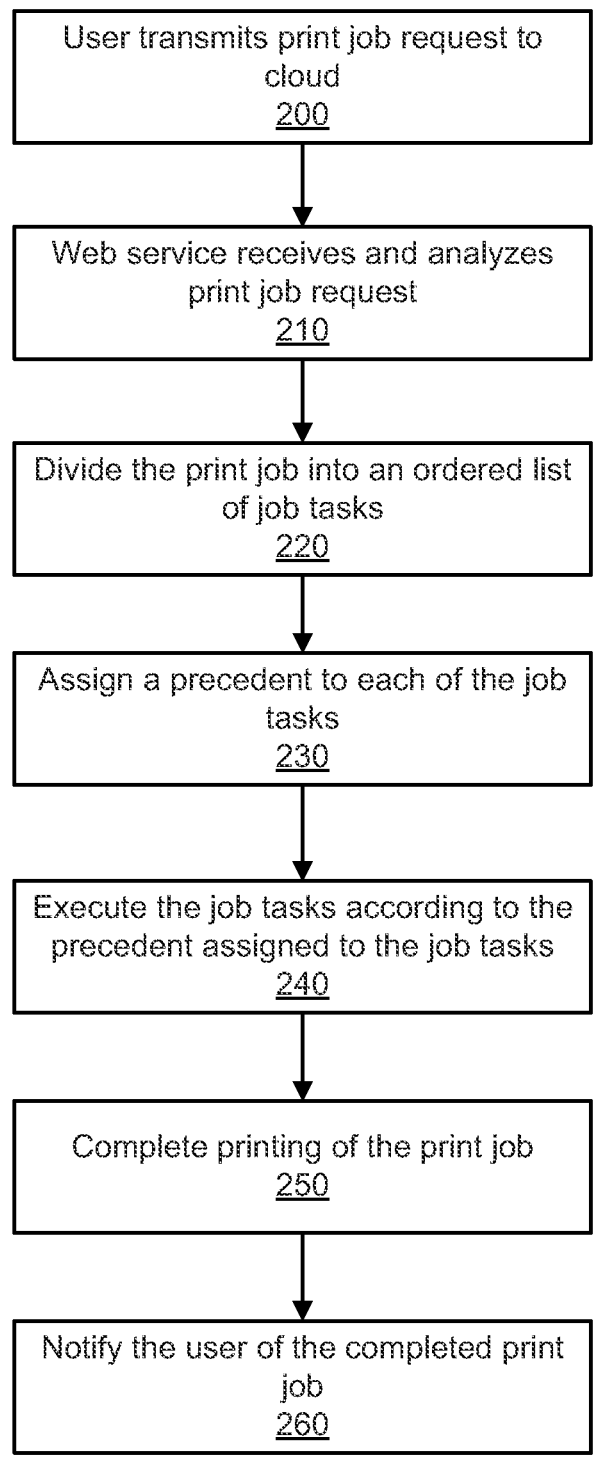
FIG. 2 shows a flow diagram executing a print job in accordance with an exemplary embodiment of the present invention.

FIG. 2 shows a flow diagram for processing and executing a print job request in accordance with an exemplary embodiment of the present invention.

According to block 200, a user transmits a print job request to the cloud print system. The print job request can be generated and transmitted from a wide variety of electronic devices including, but not limited to, notebook or desktop computers, handheld portable devices (such a mobile phone, personal digital assistant, etc.), and electronic devices with a web browser. The print job request submission is not restricted to an electronic device with a web browser since such requests can arrive from web elements such as widgets, web enabled applications, etc.

By way of example, a document to be printed is generated in an application program. In order to print the document, a user selects a print command from the application program to initiate print services which present a user interface (such as a print dialogue box or graphical user interface, GUI) that allows the user to select various print options, such as paper source, number of copies, page orientation, print quality, etc. After the user selects the print options and confirms or selects printing, the print job is transmitted from the electronic device to the cloud print system. For example, the print job is wirelessly transmitted through one or more networks (such as the internet) to the cloud print system.

A print job request can arrive from both web forms and web applications. Print requests from a web form are transmitted to a corresponding servlet that makes a call to REST API (Representational State Transfer Application Program Interface). Web applications have the ability to make direct calls to REST API.

According to block 210, a web service receives and analyzes the print job requested from the electronic device of the user.

According to block 220, the web service divides the print job into an ordered list of job tasks. The list is divided into three categories of jobs tasks that include pre-processing operations, printing the document, and post processing after completion of the print job.

According to block 230, a precedent is assigned to each of the job tasks. The precedent establishes a hierarchy or order of importance. For example, each job task is assigned a number that indicates an order in which the particular task is executed. A task assigned a higher priority or precedent is executed before or over another task assigned a lower priority or precedent. Thus, the higher precedence values are executed earlier in the associated job list.

FIG. 3 shows a table 300 with job tasks assigned a precedent in accordance with an exemplary embodiment of the present invention. The values in the table are samples and can change and include additional items. The jobs tasks (shown at the columns designated as program_code and program_name) are divided into one of three stages, job lists, or categories that include preprocessing, printing, and post-processing (shown at the columns designated as pre_processing, printing, or post_processing).

As shown in table 300, some preprocessing job tasks include converting text and document to PDF, adding a job separator, converting images to PCL and PostScript, PCL stitching, converting an image to PDF, converting a PDF to PNG preview, and PS or PDF print preferences. Examples of printing job tasks include posting to a queue and sending to the printer. Examples of post-processing include notifying a user or administrator of a print job via SMS or email, and job cleanup after a print job.

Each job task is assigned a unique identification (shown at the column designated as ID) and a precedent or priority (shown at the column designated as Precedent). The precedent is a number that determines an order in which the job task is executed. A higher number indicates a higher priority. For example in the preprocessing category, the job task of converting the document to PDF has a higher priority (shown as precedent 11) than the job task of PCL stitching (shown as precedent 5).

In one exemplary embodiment, each of the job tasks is a standalone program (for example, written in java). The input data to these programs are passed as command line parameters or obtained from the database. The system configuration related information is obtained from a package source. The job status is updated in the job record if job status information is not an error.

According to block 240, the job tasks are executed according to the precedent assigned to the job tasks. As noted, job tasks with a higher precedent are executed before or given priority over job tasks with a lower precedent.

According to block 250, printing of the print job is completed on a designated printer in the network or cloud print system (such as a printer of a print service provider). In one exemplary embodiment, a web-enabled printer is instructed to print the print job request.

According to block 260, the user is notified when the print job is completed. For example, the user is notified with text (SMS) or an email. The user or an administrator can also be notified if an error occurs during processing or printing of the requested print job.

In one exemplary embodiment, since the job tasks execute in the context of a job, a job-id folder records intermediate results, such as converted PS files. The job clean-up operation deletes the job-id folder.

Although FIG. 2 discusses processing operations of the print job, database operations also occur. Database operations involve functions such as creation of job record, recording rating information, creation or update of PSP records, etc.

The data processing for print job is fairly complex involving intense CPU (Central Processing Unit) and I/O (Input/Output) activities while database operations essentially involve I/O activity.

The web-service receiving print jobs analyzes the job request and compiles an ordered list of job tasks. These tasks are organized into job lists. The job lists are executed sequentially, while tasks of a job list are executed in the order of precedence associated with each task. The tasks may be executed in parallel on a single or distributed environment. A job state machine is maintained to move to the next task on processing the current execution unit or in case of a failure the tasks are executed from the last good known state.

Figure 4A:
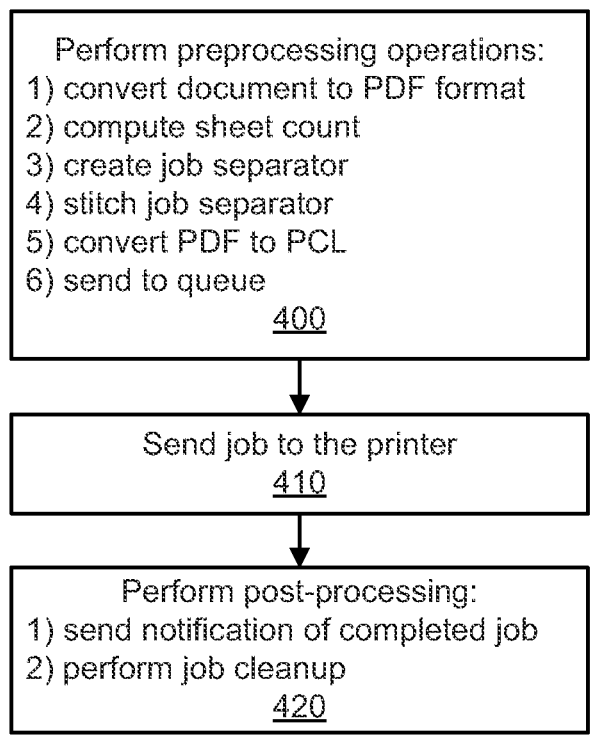
FIG. 4A shows a flow diagram of a print job being executed to a PCL printer in accordance with an exemplary embodiment of the present invention.

FIG. 4A shows a flow diagram of a print job being executed to a PCL printer in accordance with an exemplary embodiment. The job tasks are divided into one of three job lists: preprocessing operations 400, sending the job to a printer or printing the document 410, and post-processing tasks of the print job 420. These tasks describe execution of a print job to a PCL printer.

According to block 400, the preprocessing operations prepare the document for printing. By way of example, these tasks include, but are not limited to, converting the document to PDF format, computing a sheet count (i.e., number of pages to be printed), creating a job separator, stitching the job separator, converting the PDF to a PCL, and sending the converted PCL to a queue.

According to block 410, the job is sent to a web-enabled printer where the job is printed.

According to block 420, after the print job is completed, post-processing operations occur. These operations include, but are not limited to, sending notification of the completed print job to the user, an electronic device, and/or an administrator, perform job cleanup (i.e., post printing operations of the job, house-keeping activities, etc.).

Figure 4B:
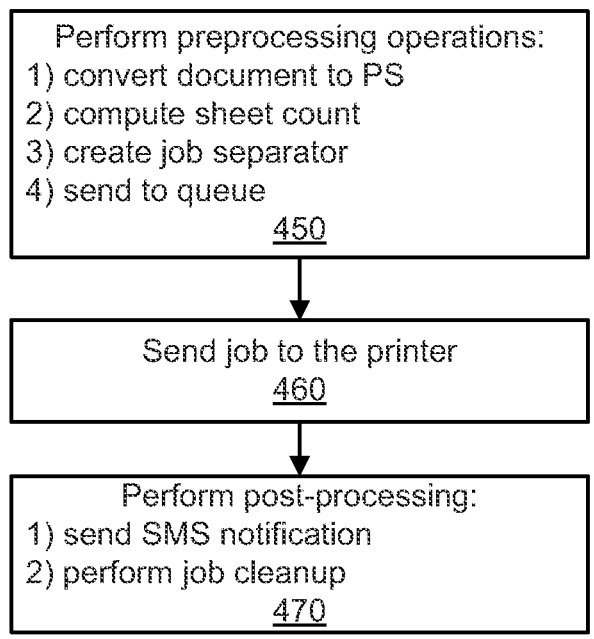
FIG. 4B shows a flow diagram of a print job being executed to a PS printer in accordance with an exemplary embodiment of the present invention.

FIG. 4B shows a flow diagram of a print job being executed to a PS printer in accordance with an exemplary embodiment.

According to block 450, the preprocessing operations prepare the document for printing. By way of example, these tasks include, but are not limited to, converting the document to PS format, computing the sheet count, creating a job separator, and sending to the queue.

According to block 460, the job is sent to a web-enabled printer where the job is printed.

According to block 470, the post-processing operations occur. By way of example, these tasks include, but are not limited to, sending an SMS notification to the user indicating that the print job successfully completed, and performing job cleanup.

Figure 5:
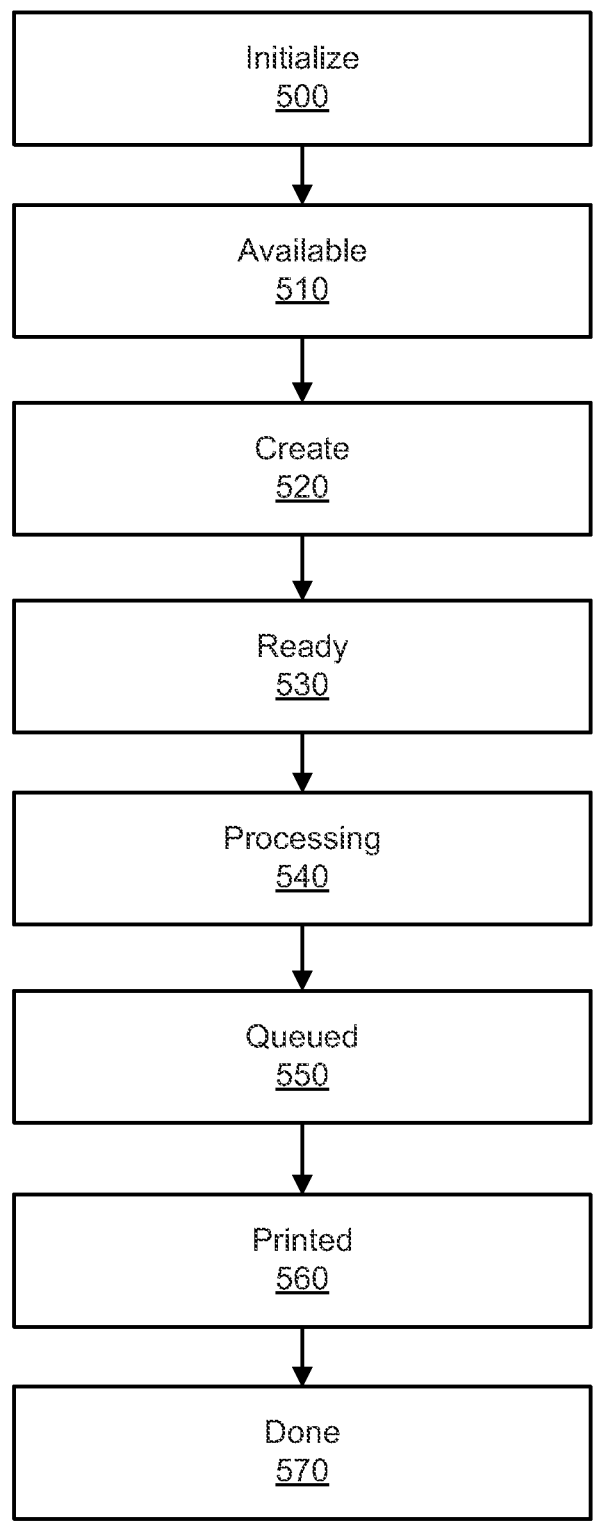
FIG. 5 show a flow diagram of a job state sequence for a print job in accordance with an exemplary embodiment of the present invention.

FIG. 5 show a flow diagram of a job state sequence for a print job in accordance with an exemplary embodiment. The job states can vary, and the states shown in FIG. 5 are exemplary.

According to block 500, the first state is "initialize." The print job commences with initialization. At the time of system initialization, a startup component resets the job state to last good state from the present state, if not already in good state. For example, if the job is in "PROCESSING" state, the system recognizes this not to be a last good state, hence resets to "READY". This reset ensures that the job list creator or job list processor can perform the required set of operations.

According to block 510, the second state is "available." The request received from the user is recorded or stored and is available for further processing.

According to block 520, the third state is "create." The server prepares the job list.

According to block 530, the fourth state is "ready." The server completes preparation of the job list, and the job is now ready for execution.

According to block 540, the fifth state is "processing." The server processes one or more items of the job. The processing prepares the job for printing.

According to block 550, the sixth state is "queued." The job is placed in a queue for subsequent manual or automatic printing. An error situation requiring retries will be in queued state.

In one exemplary embodiment, the "processing" state can be reset to one of the good intermediate task. Jobs in "queued" state will change when the job is completed successfully or when a print retry count has reached maximum value.

According to block 560, the seventh state is "printed." The job is successfully printed or printed with an error. No more print attempts remain.

According to block 570, the eighth state is "done." The server has completed processing of all job items for the print job.

Exemplary embodiments are applied in various environments, such as remote printing, driverless printing, assisted or manual printing (i.e., queued jobs are manually sent to the printer), and un-assisted or automatic printing (i.e., queued jobs are automatically sent to the printer). Further, exemplary embodiments can be used to migrate some of the printer firmware based functionality into the cloud computing environment (shown in FIG. 1 as cloud print system). Further yet, although PDF is used as an intermediate format, other formats can be used, such as XPS, PS, EMF, etc.

Figure 6:
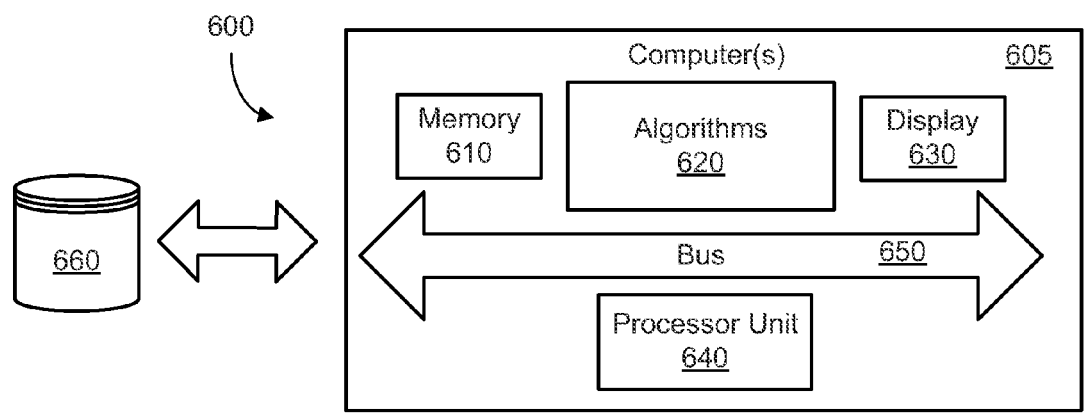
FIG. 6 is a computer system in a cloud print system in accordance with an exemplary embodiment of the present invention.

FIG. 6 is a block diagram of a computer system 600 in a cloud print system in accordance with an exemplary embodiment of the present invention. The computer system includes one or more databases or warehouses 660 coupled to one or more computers or servers 605. By way of example, the computer 605 includes memory 610, algorithms 620, display 630, processing unit 640, and one or more buses 650. The processor unit includes a processor (such as a central processing unit, CPU, microprocessor, application-specific integrated circuit (ASIC), etc.) for controlling the overall operation of memory 610 (such as random access memory (RAM) for temporary data storage, read only memory (ROM) for permanent data storage, and firmware). The processing unit 640 communicates with memory 610 and algorithms 620 via one or more buses 650 and performs operations and tasks that process and/or execute print jobs over the web in a cloud network as explained herein. The memory 610, for example, stores applications, data, programs, algorithms (including software to implement or assist in implementing embodiments in accordance with the present invention) and other data.

Definitions

As used herein and in the claims, the following words are defined as follows:

The term cloud is a computer network accessible over the internet and/or web that is dynamically scalable with virtualized resources, such as printing resources. Users are not required to have knowledge or expertise in the infrastructure of the cloud that relies on the internet to satisfy the computing or printing needs of users. The cloud provides computer and/or printer services with business applications that are accessible from a web browser while software and data are stored on servers in the cloud. For example, a printing cloud system supports infrastructure for printer services, platform for the printer services, and software for the printer services.

The term "Page Description Language" or "PDL" is a language that describes an appearance of a printed page in a higher level than output bitmap. PostScript or PS is an example of a PDL.

The term "Portable Document Format" or "PDF" is a file format for document exchange that represents two-dimensional documents in a manner that is independent of the application software, hardware, or operating system.

The term "Portable Network Graphic" or "PNG" is a bit-mapped image format that uses lossless data compression.

The term "Printer Command Language" or "PCL" is a Page Description Language (PDL) developed by Hewlett-Packard Company as a printer protocol.

The term "Short Message Service" or "SMS" is a communication service that uses standardized communication protocols to exchange short text messages between electronic devices.

The term "world wide web" or "web" is a system of linked hypertext documents access through the internet. Using a web browser, a user can view web pages that include text, images, video, and other media and navigate between these pages with hyperlinks.

The term "web application" is a software application that is accessed over one or more networks (such as the internet or an intranet). For example, web applications include applications accessed through a web browser.

The term "web-enabled printer" is a printer that is accessed to print documents over the web.

The term "web form" is a form on a web page that allows a user to enter data that is sent to a server for processing.

In one exemplary embodiment, one or more blocks or steps discussed herein are automated. In other words, apparatus, systems, and methods occur automatically. The terms "automated" or "automatically" (and like variations thereof) mean controlled operation of an apparatus, system, and/or process using computers and/or mechanical/electrical devices without the necessity of human intervention, observation, effort and/or decision.

The methods in accordance with exemplary embodiments of the present invention are provided as examples and should not be construed to limit other embodiments within the scope of the invention. Further, methods or steps discussed within different figures can be added to or exchanged with methods of steps in other figures. Further yet, specific numerical data values (such as specific quantities, numbers, categories, etc.) or other specific information should be interpreted as illustrative for discussing exemplary embodiments. Such specific information is not provided to limit the invention.

In the various embodiments in accordance with the present invention, embodiments are implemented as a method, system, and/or apparatus. As one example, exemplary embodiments and steps associated therewith are implemented as one or more computer software programs to implement the methods described herein. The software is implemented as one or more modules (also referred to as code subroutines, or "objects" in object-oriented programming). The location of the software will differ for the various alternative embodiments. The software programming code, for example, is accessed by a processor or processors of the computer or server from long-term storage media of some type, such as a CD-ROM drive or hard drive. The software programming code is embodied or stored on any of a variety of known physical and tangible media for use with a data processing system or in any memory device such as semiconductor, magnetic and optical devices, including a disk, hard drive, CD-ROM, ROM, etc. The code is distributed on such media, or is distributed to users from the memory or storage of one computer system over a network of some type to other computer systems for use by users of such other systems. Alternatively, the programming code is embodied in the memory and accessed by the processor using the bus. The techniques and methods for embodying software programming code in memory, on physical media, and/or distributing software code via networks are well known and will not be further discussed herein.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A method executed by a computer, comprising:
   receiving, at a cloud server over a web, a print job request to print a document on a specified printer;
   dividing the received print job request into a list of job tasks that includes preprocessing operations to prepare to print the document, print operations to print the document, and post-processing operations to perform after print job completion, wherein the preprocessing, print, and post-processing operations each pertain to rendering an image of the document as a hardcopy output on a print medium;
   automatically assigning, by the cloud server, a priority within each of the preprocessing, print, and post-processing operations to each job task in the list of job tasks; and
   causing the document to be printed on the specified printer independent of any other print job request by executing the job tasks in the list in order of the corresponding assigned priorities.

2. The method of claim 1 further comprising, transmitting a Short Message Service (SMS) message to a user notifying the user that the document was successfully printed.

3. The method of claim 1 further comprising, executing the print job request to a PostScript printer.

4. The method of claim 1 further comprising, performing print driver functions for the print job request at the cloud server.

5. The method of claim 1 further comprising, providing a higher priority to job tasks in the preprocessing print operations than job tasks in the post-processing operations.

6. The method of claim 1, wherein the list of job tasks is composed of tokens that are arranged in an order according to the priorities.

7. The method of claim 1, wherein the document is a web form.

8. The method of claim 1, wherein the assigning is performed prior to executing any of the preprocessing, print, and post-processing operations.

9. The method of claim 1, wherein the dividing comprises:
   automatically dividing, by the cloud server, the received print job request into the list of job tasks.

10. The method of claim 1, wherein the priority is assigned by accessing a predefined precedence table that, for each operation, specifies a corresponding priority of execution.

11. A non-transitory tangible computer readable storage medium having instructions for causing a computer to execute a method, comprising:
    analyzing a print request that is transmitted over an internet and received at a cloud print system;
    creating a list of job tasks to print the print request at a user-specified web-enabled printer, wherein all the job tasks pertain to rendering an image of a document of the print request as a hardcopy output on a print medium;
    executing plural tasks within the list of job tasks in an order corresponding to different priorities of execution automatically assigned to the job tasks; and
    instructing the web-enabled printer to print the print request on the specified printer independent of any other print request.

12. The tangible computer readable storage medium of claim 11 further comprising, assigning a number to each of the plural tasks, the number indicating an order in which the plural tasks are executed.

13. The tangible computer readable storage medium of claim 11, wherein the list of job tasks is divided into three stages of preprocessing of the print request, printing the print request, and post-processing of the print request after print job completion, and job tasks in each of the three stages are assigned different priorities of execution.

14. The tangible computer readable storage medium of claim 11 further comprising, receiving and processing, at the cloud print system, print requests from any operating system, including from computers that run Linux operating system and computers that run Windows operating system.

15. The tangible computer readable storage medium of claim 11, wherein the list of job tasks includes converting a document to Portable Document Format and converting images to Printer Command Language.

16. The tangible computer readable storage medium of claim 11, wherein the list of job tasks includes converting text to Portable Document Format and performing job cleanup after the print request is executed.

17. The tangible computer readable storage medium of claim 11, wherein the list of job tasks comprises an ordered set of job task tokens, and wherein the creating comprises:
    ordering the tokens in order of the automatically assigned priorities of execution, the order determined according to a predefined table that specifies an order of precedence of job tasks.

18. A cloud print system, comprising:
    a cloud server to:
       receive, over a web from a portable electronic device, a print request to print a document on a specified web-enabled printer;
       divide the received print request into a list of job tasks that includes preprocessing operations to prepare to print the document, print operations to print the document, and post-processing operations to perform after print job completion, wherein the preprocessing, print, and post-processing operations each pertain to rendering an image of the document as a hardcopy output on a print medium;
       automatically assign a priority within each of the preprocessing, print, and post-processing operations to each job task in the list of job tasks; and
       instruct the specified web-enabled printer to print the document independent of any other print request by executing the job tasks in order of the corresponding assigned priorities.

19. The cloud print system of claim 18 further comprising, a request handler to create a job identification for the print request and set a job state for printing the print request to "available."

20. The cloud print system of claim 18 further comprising, a job list creator to fetch a print job from a job records, create a job list for the preprocessing print operations, and set a job state for printing the print request to "ready."

21. The cloud print system of claim 18 further comprising, a job list processor to fetch the list of job tasks, execute the list of job tasks, and set a job state to "done" when printing of the document is completed.

22. The cloud print system of claim 18 further comprising a job list processor to execute the list of job tasks, wherein the job list processor is activated every minute.

23. The cloud print system of claim 18, wherein cloud server further performs print driver functions for the portable electronic device for printing the document.

24. The cloud print system of claim 18, wherein the cloud server notifies, over the web, the portable electronic device when an error occurs during processing of the print request.

* * * * *